United States Patent
Onozuka et al.

(10) Patent No.: US 12,359,044 B2
(45) Date of Patent: Jul. 15, 2025

(54) CHLOROPRENE COPOLYMER LATEX, METHOD FOR PRODUCING SAME, VULCANIZED PRODUCT, DIP MOLDED ARTICLE AND METHOD FOR PRODUCING SAME

(71) Applicant: DENKA COMPANY LIMITED, Tokyo (JP)

(72) Inventors: Masao Onozuka, Tokyo (JP); Hidehito Otsuka, Tokyo (JP)

(73) Assignee: DENKA COMPANY LIMITED, Tokyo (JP)

( * ) Notice: Subject to any disclaimer, the term of this patent is extended or adjusted under 35 U.S.C. 154(b) by 742 days.

(21) Appl. No.: 17/623,648

(22) PCT Filed: Jun. 30, 2020

(86) PCT No.: PCT/JP2020/025683
§ 371 (c)(1),
(2) Date: Dec. 29, 2021

(87) PCT Pub. No.: WO2021/006118
PCT Pub. Date: Jan. 14, 2021

(65) Prior Publication Data
US 2022/0267575 A1 Aug. 25, 2022

(30) Foreign Application Priority Data
Jul. 5, 2019 (JP) .................................. 2019-126035

(51) Int. Cl.
*C08L 11/02* (2006.01)
*C08F 236/18* (2006.01)
*C09D 111/02* (2006.01)

(52) U.S. Cl.
CPC ............. *C08L 11/02* (2013.01); *C08F 236/18* (2013.01); *C09D 111/02* (2013.01)

(58) Field of Classification Search
CPC ....... C08L 11/02; C08F 236/18; C09D 111/02
See application file for complete search history.

(56) References Cited

U.S. PATENT DOCUMENTS

2013/0337573 A1* 12/2013 Sunada ................ C08J 3/05
436/125
2018/0112055 A1* 4/2018 Ogawa ................ C08L 11/02

FOREIGN PATENT DOCUMENTS

| EP | 3284781 A1 | | 2/2018 |
|---|---|---|---|
| JP | 2007106994 A | * | 4/2007 |
| JP | 2009108195 A | | 5/2009 |
| JP | 2010126586 A | | 6/2010 |
| JP | 2014114342 A | | 6/2014 |
| JP | 2019044116 A | | 3/2019 |
| JP | 2019143002 A | | 8/2019 |
| WO | 2016166998 A1 | | 10/2016 |
| WO | 2019009038 A1 | | 1/2019 |

OTHER PUBLICATIONS

Machine translation of JP-2010126586-A obtained from Espacenet (Year: 2010).*
Machine translation of JP-2007106994-A obtained from Espacenet (Year: 2007).*
Wang et al., "Experiments in Polymer Materials and Engineering", Shaanxi People's Publishing House, Sep. 30, 2007, p. 158.
PCT International Preliminary Report on Patentability with Written Opinion for International Application No. PCT/2020/025683; Date of Mailing, Jan. 20, 2022.
International Search Report for International Application No. PCT/JP2020/025683; Date of Mailing, Sep. 24, 2020.

* cited by examiner

*Primary Examiner* — Kregg T Brooks
*Assistant Examiner* — David R. Foss
(74) *Attorney, Agent, or Firm* — CANTOR COLBURN LLP

(57) ABSTRACT

A chloroprene copolymer latex containing a chloroprene copolymer having a structural unit derived from chloroprene and a structural unit derived from 2,3-dichloro-1,3-butadiene, in which a toluene insoluble content in the chloroprene copolymer is 50 to 95% by mass, and a modulus at 500% elongation of a film, which is obtained on a base material by dipping the base material in the chloroprene copolymer latex and then performing vulcanization at 100° C. for 30 minutes, according to JIS K 6251 is 4.0 MPa or less.

16 Claims, No Drawings

CHLOROPRENE COPOLYMER LATEX, METHOD FOR PRODUCING SAME, VULCANIZED PRODUCT, DIP MOLDED ARTICLE AND METHOD FOR PRODUCING SAME

CROSS REFERENCE TO RELATED APPLICATIONS

This is the U.S. national stage of application No. PCT/JP2020/025683, filed on Jun. 30, 2020. Priority under 35 U.S.C. § 119 (a) and 35 U.S.C. § 365 (b) is claimed from Japanese Application No. 2019-126035, filed Jul. 5, 2019, the disclosure of which is also incorporated herein by reference.

TECHNICAL FIELD

The present invention relates to a chloroprene copolymer latex, a method for producing the same, a vulcanizate, a dip molded article, a method for producing the sane, and the like.

BACKGROUND ART

Chloroprene polymers have been known as materials for dip molded articles such as surgical gloves for medical purposes, laboratory gloves, industrial gloves, balloons, catheters, and rubber boots.

Various techniques concerned with chloroprene polymers for dip molded articles have been proposed.

Patent Literature 1 below describes a latex composition containing a chloroprene-based polymer latex, which is obtained by copolymerizing 2,3-dichloro-1,3-butadiene and sulfur at a specific ratio, a metal oxide, a vulcanization accelerator, and an antioxidant.

Patent Literature 2 below describes a composition for rubber containing a chloroprene-based polymer latex having a specific tetrahydrofuran insoluble matter content, a metal oxide, an antioxidant, a surfactant, and a pH adjuster, and being free of a vulcanization accelerator.

Patent Literature 3 below describes a polychloroprene latex containing a modified polychloroprene, which is obtained by copolymerizing chloroprene and methacrylic acid, water, art emulsifier, and a potassium ion.

Patent Literature 4 below describes a mercaptan-modified polychloroprene latex containing a copolymer of chloroprene and a specific copolymerization amount of 2,3-dichloro-1,3-butadiene.

CITATION LIST

Patent Literature

Patent Literature 1: Japanese Unexamined Patent Publication No. 2019-044116
Patent Literature 2: International Publication WO 2016/166998
Patent Literature 3: Japanese Unexamined Patent Publication No. 2014-114342
Patent Literature 4: International Publication WO 2019/009038

SUMMARY OF INVENTION

Technical Problem

With respect to a film of a dip molded article, it is required to improve breaking strength and breaking elongation as mechanical properties. On the other hand, in the related arts, since the adjustment of the polymer structure is insufficient, it is necessary to improve mechanical properties by performing vulcanization at a high temperature or for a long time, but from the viewpoints of improving productivity and reducing cost, a decrease in temperature and time for vulcanization is required. In this case, for example, although it is considered that a vulcanization accelerator is used for decreasing time for vulcanization, the vulcanization accelerator tends to be an allergen (causal substance) of type IV allergy causing skin diseases such as dermatitis, and thus it is required to reduce or not to use a vulcanization accelerator. However, in the related arts, long-term vulcanization is necessary for compensating for a decrease in mechanical properties caused by not using a vulcanization accelerator. From such circumstances, it is required to obtain a vulcanizate having excellent breaking strength and breaking elongation even in the case of performing vulcanization at a low temperature in a short time without using a vulcanization accelerator.

An aspect of the present invention is intended to provide a chloroprene copolymer latex capable of obtaining a vulcanizate having excellent breaking strength and breaking elongation even in the case of performing vulcanization at a low temperature in a short time (100° C. 30 minutes) without using a vulcanization accelerator. Another aspect of the present invention is intended to provide a vulcanizate of the above-described chloroprene copolymer latex, a dip molded article of the above-described chloroprene copolymer latex, and a method for producing the same. Still another aspect of the present invention is intended to provide a method for producing the above-described chloroprene copolymer latex.

Solution to Problem

The present inventors have found that the aforementioned problems can be solved, in a chloroprene copolymer latex containing a chloroprene copolymer having a structural unit derived from chloroprene and a structural unit derived from 2,3-dichloro-1,3-butadiene, by adjusting a toluene insoluble content in the chloroprene copolymer and by adjusting a modulus at 500% elongation of a predetermined vulcanizate which the chloroprene copolymer latex provides.

An aspect of the present invention provides a chloroprene copolymer latex containing a chloroprene copolymer having a structural unit derived from chloroprene and a structural unit derived from 2,3-dichloro-1,3-butadiene, in which a toluene insoluble content in the chloroprene copolymer is 50 to 95% by mass, and a modulus at 500% elongation of a film, which is obtained on a base material by dipping the base material in the chloroprene copolymer latex and then performing vulcanization at 100° C. for 30 minutes, according to JIS K 6251 is 4.0 MPa or less.

According to such a chloroprene copolymer latex, a vulcanizate having excellent breaking strength and breaking elongation can be obtained even in the case of performing vulcanization at a low temperature in a short time (100° C., 30 minutes) without using a vulcanization accelerator.

Another aspect of the present invention provides a vulcanizate of the aforementioned chloroprene copolymer latex. Still another aspect of the present invention provides a dip molded article of the aforementioned chloroprene copolymer latex. Still another aspect of the present invention provides a method for producing a dip molded article, the method including a step of dip molding the aforementioned chloroprene copolymer latex.

Still another aspect of the present invention provides a method for producing a chloroprene copolymer latex, the method being a production method for obtaining the aforementioned chloroprene copolymer latex, the method including a polymerization step of subjecting chloroprene and 2,3-dichloro-1,3-butadiene to emulsion polymerization up to a polymerization conversion rate of 60 to 95%, in which in the polymerization step, a content of the 2,3-dichloro-1,3-butadiene is more than 0 parts by mass and 35 parts by mass or less with respect to 100 parts by mass of the total of the chloroprene and the 2,3-dichloro-1,3-butadiene.

According to such a method for producing a chloroprene copolymer latex, it is possible to obtain a chloroprene copolymer latex capable of obtaining a vulcanizate having excellent breaking strength and breaking elongation even in the case of performing vulcanization at a low temperature in a short time (100° C., 30 minutes) without using a vulcanization accelerator.

Advantageous Effects of Invention

According to an aspect of the present invention, it is possible to provide a chloroprene copolymer latex capable of obtaining a vulcanizate having excellent breaking strength and breaking elongation even in the case of performing vulcanization at a low temperature in a short time (100° C., 30 minutes) without using a vulcanization accelerator. According to another aspect of the present invention, it is possible to provide a vulcanizate of the above-described chloroprene copolymer latex, a dip molded article of the above-described chloroprene copolymer latex, and a method for producing the same. According to still another aspect of the present invention, it is possible to provide a method for producing the above-described chloroprene copolymer latex.

DESCRIPTION OF EMBODIMENTS

Hereinafter, embodiments for carrying out the present invention will be specifically described. Note that, the present invention is not limited to embodiments described below.

In the present specification, a numerical range that has been indicated by use of "to" indicates the range that includes the numerical values which are described before and after "to", as the minimum value and the maximum value, respectively. "A or more" of the numerical range means A and a range of more than A, "A or less" of the numerical range means A and a range of less than A. In the numerical ranges that are described stepwise in the present specification, the upper limit value or the lower limit value of the numerical range of a certain stage can be arbitrarily combined with the upper limit value or the lower limit value of the numerical range of another stage. In the numerical ranges that are described in the present specification, the upper limit value or the lower limit value of the numerical value range may be replaced with the value shown in Examples. "A or B" may include any one of A and B, and may also include both of A and B. Materials listed as examples in the present specification may be used singly or in combinations of two or lore kinds thereof, unless otherwise specified. In a case where a plurality of substances corresponding to each component exist in the composition, the content of each component in the composition means the total amount of the plurality of substances that exist in the composition, unless otherwise specified. The term "film" includes a structure having a shape which is formed on a part, in addition to a structure having a shape which is formed on the whole surface, when the film is observed as a plan view. The term "step" includes not only an independent step but also a step by which an intended action of the step is achieved, though the step cannot be clearly distinguished from other steps. A "(meth)acrylate" means at least one of acrylates and corresponding methacrylates. "HS" means Japanese Industrial Standards.

<Chloroprene Copolymer Latex>

A chloroprene copolymer latex of the present embodiment contains a chloroprene copolymer having a structural unit derived from chloroprene (2-chloro-1,3-butadiene) and a structural unit derived from 2,3-dichloro-1,3-butadiene. This chloroprene copolymer is a copolymer of chloroprene and 2,3-dichloro-1,3-butadiene. A toluene insoluble content in the chloroprene copolymer is 50 to 95% by mass. A modulus at 500% elongation of a film, which is obtained on a base material by dipping the base material in the chloroprene copolymer latex of the present embodiment and then performing vulcanization at 100° C. for 30 minutes, according to HS K 6251 is 4.0 MPa or less.

According to the chloroprene copolymer latex of the present embodiment, a vulcanizate having excellent breaking strength and breaking elongation can be obtained even in the case of performing vulcanization at a low temperature in a short time (100° C., 30 minutes) without using a vulcanization accelerator, and such a vulcanizate can be obtained as a dip molded film. According to the chloroprene copolymer latex of the present embodiment, the breaking strength of 18 MPa or more (for example, 18 to 25 MPa) can be obtained and the breaking elongation of 1000% or more (for example, 1000 to 1500%) can be obtained. According to the chloroprene copolymer latex of the present embodiment, in a case where this chloroprene copolymer latex contains sulfur, zinc oxide, a butylated reaction product of p-cresol and dicyclopentadiene, and a sodium salt of β-naphthalene sulfonic acid formalin condensate, a vulcanizate having excellent breaking strength and breaking elongation can be obtained even in the case of performing vulcanization at a low temperature in a short time (100° C., 30 minutes) without using a vulcanization accelerator.

According to the chloroprene copolymer latex of the present embodiment, productivity, improvement and cost reduction can be achieved by vulcanization under conditions (100° C., 30 minutes) that are more moderate than in the related art. According to the chloroprene copolymer latex of the present embodiment, a vulcanizate having excellent, breaking strength and breaking elongation can be obtained while refraining from the use of an allergen of type IV allergy. According to the chloroprene copolymer latex of the present embodiment, mechanical properties that are equal to or higher than those of a vulcanizate obtained by a conventional chloroprene copolymer latex can be obtained without using a vulcanization accelerator. According to the chloroprene copolymer latex of the present embodiment, a vulcanizate having excellent breaking strength and breaking elongation can be obtained even by using a vulcanization accelerator.

The content of the structural unit derived from chloroprene in the chloroprene copolymer contained in the chloroprene copolymer latex is more than 0% by mass and less than 100% by mass on the basis of the total amount of the structural unit derived from chloroprene and the structural unit derived from 2,3-dichloro-1,3-butadiene contained in the chloroprene copolymer or the total amount of the structural units contained in the chloroprene copolymer, and is preferably in the following range. The content of the structural unit derived from chloroprene, is preferably 99% by mass or less, more preferably 97% by mass or less, and further preferably 96% by mass or less, from the viewpoint of easily obtaining excellent breaking strength and breaking elongation of a vulcanizate. The content of the structural unit derived from chloroprene is preferably 65% by mass or more, more preferably 68% by mass or more, and further preferably 70% by mass or more, from the viewpoint of easily obtaining excellent breaking strength and breaking elongation of a vulcanizate. From these viewpoints, the content of the structural unit derived from chloroprene is preferably 65 to 99% by mass and more preferably 65 to 96% by mass. The content of the structural unit derived from chloroprene may be 95% by mass or less, 93% by mass or less, less than 93% by mass, 91% by mass or less, less than 91% by mass, 90% by mass or less, 88% by mass or less, 85% by mass or less, 82% by mass or less, 80% by mass or less, less than 80% by mass, 78% by mass or less, 76% by mass or less, less than 76% by mass, 75% by mass or less, 72% by mass or less, or 71% by mass or less. The content of the structural unit derived from chloroprene may be more than 70% by mass, 71% by mass or more, 72% by mass or more, 75% by mass or more, 76% by mass or more, more than 76% by mass, 78% by mass or more, 80% by mass or more, more than 80% by mass, 82% by mass or more, 85% by mass or more, 88% by mass or more, 90% by mass or more, 91% by mass or more, more than 91% by mass, 93% by mass or more, more than 93% by mass, or 95% by mass or more.

The content of the structural unit derived from 2,3-dichloro-1,3-butadiene (copolymerization amount of 2,3-dichloro-1,3-butadiene) in the chloroprene copolymer contained in the chloroprene copolymer latex is more than 0% by mass and less than 100% by mass on the basis of the total amount of the structural unit derived from chloroprene and the structural unit derived from 2,3-dichloro-1,3-butadiene contained in the chloroprene copolymer or the total amount of the structural units contained in the chloroprene copolymer, and is preferably in the following range. The content of the structural unit derived from 2,3-dichloro-1,3-butadiene is preferably 1% by mass or more, more preferably 3% by mass or more, and further preferably 4% by mass or more, from the viewpoint of easily obtaining excellent breaking strength and breaking elongation of a vulcanizate. The content of the structural unit derived from 2,3-dichloro-1,3-butadiene is preferably 35% by mass or less, more preferably 32% by mass or less, and further preferably 30% by mass or less, from the viewpoint of easily obtaining excellent breaking strength and breaking elongation of a vulcanizate. From these viewpoints, the content of the structural unit derived from 2,3-dichloro-1,3-butadiene is preferably 1 to 35% by mass and more preferably 4 to 35% by mass. The content of the structural unit derived from 2,3-dichloro-1,3-butadiene may be 5% by mass or more, 7% by mass or more, more than 7% by mass, 9% by mass or more, more than 9% by mass, 10% by mass or more, 12% by mass or more, 15% by mass or more, 18% by mass or more, 20% by mass or more, more than 20% by mass, 22% by mass or more, 24% by mass or more, more than 24% by mass, 25% by mass or more, 28% by mass or more, or 29% by mass or more. The content of the structural unit derived from 2,3-dichloro-1,3-butadiene may be less than 30% by mass, 29% by mass or less, 28% by mass or less, 25% by mass or less, 24% by mass or less, less than 24% by mass, 22% by mass or less, 20% by mass or less, less than 20% by mass, 18% by mass or less, 15% by mass or less, 12% by mass or less, 10% by mass or less, 9% by mass or less, less than 9% by mass, 7% by mass or less, less than 7% by mass, or 5% by mass or less.

The chloroprene copolymer may have a structural unit derived from a monomer other than the chloroprene and the 2,3-dichloro-1,3-butadiene, and may be a copolymer of three or more kinds of monomers including chloroprene and 2,3-dichloro-1,3-butadiene. Examples of such a monomer de esters of acrylic acid (such as methyl acrylate, butyl acrylate, and 2-ethylhexyl acrylate), esters of methacrylic acid (such as methyl methacrylate, butyl methacrylate, and 2-ethylhexyl methacrylate), hydroxy (meth)acrylates (such as 2-hydroxyethyl (meth)acrylate, 2-hydroxymethyl (meth)acrylate, and 2-hydroxypropyl (meth)acrylate), 1-chloro-1,3-butadiene, butadiene, isoprene, ethylene, and styrene. The chloroprene copolymer may have a structural unit derived from a carboxyl group-containing vinyl monomer (for example, methacrylic acid) or may not have a structural unit derived from a carboxyl group-containing vinyl monomer (for example, methacrylic acid). The content of the structural unit derived from the carboxyl group-containing vinyl monomer (for example, methacrylic acid) may be less than 0.5% by mass on the basis of the total amount of the chloroprene copolymer.

The toluene insoluble content (the content of the insoluble component with respect to toluene at 23° C.) in the chloroprene copolymer contained in the chloroprene copolymer latex of the present embodiment is 50 to 95% by mass on the basis of the total amount of the chloroprene, copolymer. In a case where the toluene insoluble content is less than 50% by mass or the toluene insoluble content is more than 95% by mass, the breaking strength of a vulcanizate deteriorates.

The toluene insoluble content in the chloroprene copolymer is preferably 52% by mass or more, more preferably 55% by mass or more, further preferably 57% by mass or more, from the viewpoint of easily obtaining excellent breaking strength and breaking elongation of a vulcanizate. The toluene insoluble content in the chloroprene copolymer may be 59% by mass or more, 60% by mass or more, 65% by mass or more, 70% by mass or more, more than 70% by mass, 75% by mass or more, 80% by mass or more, 85% by mass or more, more than 85% by mass, 86% by mass or more, 88% by mass or more, 89% by mass or more, 90% by mass or more, 91% by mass or more, or 93% by mass or more. The toluene insoluble content in the chloroprene copolymer is preferably less than 95% by mass and more preferably 93% by mass or less, from the viewpoint of easily obtaining excellent flexibility of a vulcanizate (for example, a film-shaped vulcanizate). The toluene insoluble content in the chloroprene copolymer may be 91% by mass or less, 90% by mass or less, 89% by mass or less, 88% by mass or less, 86% by mass or less, 85% by mass or less, less than 85% by mass, 80% by mass or less, 75% by mass or less, 70% by mass or less, less than 70% by mass, 65% by mass or less, 60% by mass or less, 59% by mass or less, or 57% by mass or less. The toluene insoluble content in the chloroprene copolymer can be adjusted by the polymerization conversion rate at the time of polymerization, the type and charged amount of the chain transfer agent, and the like.

the "toluene insoluble content" can be measured by the following procedures. First, the chloroprene copolymer obtained by freeze-drying the chloroprene copolymer latex is dissolved with toluene set at 23° C. to obtain a solution. This solution is subjected to centrifugation and then the gel fraction is separated using a 200-mesh wire mesh. After this gel fraction is dried to obtain a dried product, the mass of this dried product is measured to thereby obtain the toluene insoluble content.

The chloroprene copolymer contained in the chloroprene copolymer latex of the present embodiment preferably provides a peak derived from abietic acid in gas chromatography of an extract (extracted component) extracted from the chloroprene copolymer using an ethanol/toluene azeotropic mixture (ETA). In this case, a vulcanizate (for example, a dip molded film) having further satisfactory mechanical properties (for example, breaking strength) is obtained. The presence or absence of the peak derived from abietic acid in the chloroprene copolymer is attributable to the type of rosin acids to be added as an emulsifier, as described below.

The peak derived from abietic acid can be measured by the following procedures. First, the chloroprene copolymer obtained by freeze-drying the chloroprene copolymer latex is cut to thereby, obtain a test piece. This test piece is put in an eggplant-shaped flask equipped with a condenser and an extract (rosin acids or the like) is extracted with an ethanol/toluene azeotropic mixture (ETA) as defined in JIS K 6229. The peak derived from abietic acid can be checked by measuring this extract by gas chromatography using a gas chromatograph.

The chloroprene copolymer latex of the present embodiment may contain a vulcanizing agent. Examples of the vulcanizing agent include sulfur, zinc oxide, and magnesium oxide.

The chloroprene copolymer latex of the present embodiment may contain a vulcanization accelerator or may not contain a vulcanization accelerator. Examples of the vulcanization accelerator include dithiocarbamate-based vulcanization accelerators such as zinc diethyldithiocarbamate, zinc dibutyldithiocarbamate, and sodium dibutyldithiocarbamate; thiourea-based vulcanization accelerators such as ethylene thiourea, diethylthiourea, trimethylthiourea, triethylthiourea, N,N-diphenylthiourea, and N,N'-diethylthiourea; guanidine-based vulcanization accelerators such as 1,3-diphenyl guanidine; thiuram-based vulcanization accelerators such as tetramethylthiuram disulfide and tetraethylthiuram disulfide; thiazole-based vulcanization accelerators; and xanthogenic acid-based vulcanization accelerators. The chloroprene copolymer latex of the present embodiment may not contain at least one selected from the group consisting of a dithiocarbamate-based vulcanization accelerator, a thiourea-based vulcanization accelerator, a guanidine-based vulcanization accelerator, a thiuram-based vulcanization accelerator, a thiazole-based vulcanization accelerator, and a xanthogenic acid-based vulcanization accelerator. The chloroprene copolymer latex of the present embodiment can obtain a vulcanizate having excellent mechanical properties without containing a vulcanization accelerator.

The chloroprene copolymer latex of the present embodiment can contain additives such as a surfactant, a freezing stabilizer, an emulsion stabilizer, a viscosity modifier, an antioxidant, and an antiseptic. The content of the surfactant may be less than 0.1 parts by mass with respect to 100 parts by mass of the chloroprene copolymer.

In the chloroprene copolymer latex of the present embodiment, the modulus at 500% elongation of a film (vulcanizate), which is obtained on a base material by dipping (for example, dipping for 10 seconds) the base material in the chloroprene copolymer latex and then performing vulcanization at 100° C. for 30 minutes, according to JIS K 6251 (the modulus at 500% elongation as measured according to JIS K 6251) is 4.0 MPa or less from the viewpoint of obtaining excellent breaking elongation of a vulcanizate. The modulus at 500% elongation is preferably 3.5 MPa or less, more preferably 3.0 MPa or less, further preferably 2.5 MPa or less, particularly preferably 2.0 MPa or less, extremely preferably 1.8 MPa or less, and highly preferably 1.5 MPa or less, from the viewpoint of easily obtaining excellent breaking elongation of a vulcanizate. The modulus at 500% elongation may be 1.4 MPa or less, 1.3 MPa or less, or 1.2 MPa or less. The modulus at 500% elongation may be 0.3 MPa or more, 0.5 MPa or more, 0.7 MPa or more, 0.8 MPa or more, 1.0 MPa or more, 1.2 MPa or more, 1.3. MPa or more, 1.4 MPa or more, or 1.5 MPa or more. From these viewpoints, the modulus at 500% elongation may be 0.1 to 4.0 MPa, 0.1 to 10 MPa, or 0.7 to 1.2. MPa. The modulus at 500% elongation may be. The modulus at 500% elongation can be adjusted by the type and charged amount of the monomer, the polymerization conversion rate and the polymerization temperature at the time of polymerization, and the like.

In the chloroprene copolymer latex of the present embodiment, the modulus at 100% elongation of a film vulcanizate), which is obtained on a base material by dipping (for example, dipping for 10 seconds) the base material in the chloroprene copolymer latex and then performing vulcanization at 100° C. for 30 minutes, according to JIS K 62.51 (the modulus at 100% elongation as measured according to JIS K 6251) is preferably in the following range. The modulus at 100% elongation is preferably 1.5 MPa or less, more preferably 1.2 MPa or less, further preferably 1.0 MPa or less, and particularly preferably 0.9 MPa or less, from the viewpoint of easily obtaining excellent breaking elongation of a vulcanizate. The modulus at 100% elongation may be 0.8 MPa or less or 0.7 MPa or less. The modulus at 100% elongation may be 0.1 MPa. or more, 0.3 MPa or more, 0.5 MPa or more, 0.7 MPa or more, 0.8 MPa or more, or 0.9 MPa or more. From these viewpoints, the modulus at 100% elongation may be 0.1 to 1.5 MPa, 0.1 to 1.2 MPa, or 0.5 to 1.2 MPa. The modulus at 100% elongation can be adjusted by the type and charged amount of the monomer, the polymerization conversion rate and the polymerization temperature at the time of polymerization, and the like.

A film providing the aforementioned modulus at elongation may be obtained by dipping a base material in the chloroprene copolymer latex and then washing with running water set at 4.15° C. for 1 minute, and performing vulcanization at 1.00° C. for 30 minutes. The temperature of the chloroprene copolymer latex when the base material is dipped may be 23° C. The film providing the aforementioned modulus at elongation may be obtained by dipping (for example, dipping for 1 second) a base material in a congealing liquid (for example, 23° C.) and then dipping this base material in the chloroprene copolymer latex. As the congealing liquid, for example, a congealing liquid obtained by mixing 6:2 parts by mass of water, 35 parts by mass of potassium nitrate tetrahydrate, and 3 parts by mass of calcium carbonate can be used. The base material may be, for example, a ceramic cylinder having an outer diameter of 50 mm.

<Method for Producing Chloroprene Copolymer Latex>

A method for producing a chloroprene copolymer latex of the present embodiment is a production method for obtaining the chloroprene copolymer latex of the present embodiment. The method for producing a chloroprene copolymer latex of the present embodiment includes a polymerization step of subjecting chloroprene and 2,3-dichloro-1,3-butadiene to emulsion polymerization up to a polymerization conversion rate of 60 to 95%, and in the polymerization step, a content of the 2,3-dichloro-1,3-butadiene is more than 0 parts by mass and 35 parts by mass or less with respect to 100 parts by mass of the total of the chloroprene and the 2,3-dichloro-1,3-butadiene.

The charged amount of the 2,3-dichloro-1,3-butadiene before the emulsion polymerization initiation in the polymerization step is more than 0 parts by mass on the basis of 100 parts by mass of the total of the chloroprene and the 2,3-dichloro-1,3-butadiene or the total amount of the monomers for obtaining a chloroprene copolymer, and is preferably in the following range. The charged amount of the 2,3-dichloro-1,3-butadiene is preferably 1 part by mass or more, more preferably 3 parts by mass or more, further preferably 4 parts by mass or more, and particularly preferably 5 parts by mass or more, from the viewpoint of easily obtaining excellent flexibility of a vulcanizate (for example, a film-shaped vulcanizate). The charged amount of the 2,3-dichloro-1,3-butadiene is preferably 32 parts by mass or less and more preferably 30 parts by mass or less, from the viewpoint of easily obtaining excellent breaking strength and breaking elongation of a vulcanizate. From these viewpoints, the charged amount of the 2,3-dichloro-1,3-butadiene is preferably more than 0 parts by, mass and 3:2 parts by mass or less and more preferably 5 to 30 parts by mass. The charged amount of the 2,3-dichloro-1,3-butadiene may be 7 parts by mass or more, more than 7 parts by mass, 9 parts by mass or more, more than 9 parts by mass, 10 parts by mass or more, 12 parts by mass or more, 15 parts by mass or more, 18 parts by mass or more, 20 parts by mass or more, more than 20 parts by mass, 22 parts by mass or more, 24 parts by mass or more, more than 24 parts by mass, 25 parts by mass or more, 28 parts by mass or more, 29 parts by mass or more, or 30 parts by mass or more. The charged amount of the 2,3-dichloro-1,3-butadiene may be 29 parts by mass or less, 28 parts by mass or less, 2.5 parts by mass or less, 24 parts by mass or less, less than 2.4 parts by mass, 22 parts by mass or less, 20 parts by mass or less, less than 20 parts by mass, 18 parts by mass or less, 15 parts by mass or less, 12 parts by mass or less, 10 parts by mass or less, 9 parts by mass or less, less than 9 parts by mass, 7 parts by mass or less, less than 7 parts by mass, or 5 parts by mass or less.

The polymerization temperature in the polymerization step (the polymerization temperature of the emulsion polymerization) is preferably in the following range. The polymerization temperature is preferably 10° C. or higher, more preferably 1.2° C.' or higher, and further preferably 15° C. or higher, from the viewpoint of easily obtaining a preferable modulus at elongation of a vulcanizate. The polymerization temperature is preferably lower than 30° C., more preferably 25° C. or lower, and further preferably 23° C.' or lower, from the viewpoint of easily obtaining excellent breaking strength of a vulcanizate. From these viewpoints, the polymerization temperature is preferably 1.0° C. or higher and lower than 30° C. and more preferably 10° C. to 25° C.

A chain transfer agent can be used on the occasion of emulsion polymerization. The chain transfer agent is not particularly limited, and examples thereof include long chain alkylmercaptans such as n-dodecylmercaptan and tert-dodecylmercaptan; dialkylxanthogen disulfides such as diisopropylxanthogen disulfide, and diethylxanthogen disulfide; and iodoform. As the chain transfer agent, a known chain transfer agent that is generally used in emulsion polymerization of chloroprene can be used.

Regarding the charged amount of the chain transfer agent before the emulsion polymerization initiation, the type and amount thereof can be adjusted so that the toluene insoluble content after the completion of polymerization becomes 50 to 95% by mass. Since the toluene insoluble content is affected by the polymerization conversion rate in addition to the type and amount of the chain transfer agent, it is preferable to adjust the toluene insoluble content by appropriately adjusting the type and amount of the chain transfer agent, the polymerization conversion rate, and the like. For example, 0.14 parts by mass of diisopropylxanthogen disulfide is charged with respect to 100 parts by mass of the total of the chloroprene and the 2,3-dichloro-1,3-butadiene, and polymerization is performed up to a polymerization conversion rate of 60 to 95% (for example, about 90%), thereby obtaining a chloroprene copolymer latex having a preferable toluene insoluble content.

As an emulsifier that is used in emulsion polymerization, rosin acids are suitable, and rosin acids providing a peak derived from abietic acid are preferred. Examples of the rosin acids providing a peak derived from abietic acid include raw rosin acids that are not disproportionated.

Other emulsifiers and/or fatty acids that are generally used can also be used. Examples of the other emulsifiers include a metal salt of aromatic sulfinic acid formalin condensate (for example, a sodium salt of β-naphthalene sulfonic acid formalin condensate), sodium dodecylbenzenesulfonate, potassium dodecylbenzenesulfonate, sodium alkyl diphenyl ether sulfonate, potassium alkyl diphenyl ether sulfonate, sodium polyoxyethylene alkyl ether sulfonate, sodium polyoxypropylene alkyl ether sulfonate, potassium polyoxypropylene alkyl ether sulfonate, and potassium polyoxypropylene alkyl ether ether sulfonate.

The pH of the aqueous emulsion at the time of emulsion polymerization initiation is preferably 10.5 to 13.5. The aqueous emulsion indicates a liquid mixture containing a chain transfer agent, chloroprene, 2,3-dichloro-1,3-butadiene, and the like immediately before emulsion polymerization initiation, and it encompasses an embodiment which the composition thereof varies by adding components afterward or adding components in portions. When the pH of the aqueous emulsion at the time of emulsion polymerization initiation is 10.5 or more, the polymerization reaction can be more stably controlled. When the pH is 13.5 or less, an excessive increase in viscosity during polymerization is suppressed, and thus the polymerization reaction can be more stably controlled.

Examples of a polymerization initiator include potassium persulfate, benzoyl peroxide, ammonium persulfate, and hydrogen peroxide which are usually used in radical polymerization.

The polymerization conversion rate in the polymerization step is 60 to 95%. The polymerization reaction can be terminated by adding a polymerization inhibitor. When the polymerization conversion rate is 60% or more, a decrease in toluene insoluble content is suppressed, so that the breaking strength of a vulcanizate (for example, a dip molded film) is suppressed from being impaired and an increase in cost can be avoided. The polymerization conversion rate is preferably 63% or more, more preferably 65% or more, and further preferably 67% or more, from the viewpoint of easily obtaining excellent breaking strength of a vulcanizate. The polymerization conversion rate may be 70% or more, 75% or more, 80% or more, 85% or more, 86% or more, 88% or more, 89% or more, 90% or more, 92% or more, or 93% or more. When the polymerization conversion rate is 95% or less, a decrease in polymerization reactivity attributable to a decrease in unreacted monomers is suppressed, so that a decrease in productivity is avoided and excellent breaking strength of a vulcanizate (for example, a dip molded film) is obtained. The polymerization conversion rate is preferably 93% or less from the viewpoint of easily obtaining excellent breaking strength of a vulcanizate. The polymerization conversion rate may be 92% or less, 90% or less, 89% or less, 88% or less, 86% or less, 85% or less, 80% or less, 75% or less, 70% or less, 67% or less, or 65% or less.

Examples of the polymerization inhibitor include diethylhydroxylamine, thiodiphenylamine, 4-tert-butylcatechol, 2,2'-methylenebis-4-methyl-6-tart-butylphenol, and butylated reaction products of p-cresol and dicyclopentadiene. The unreacted monomer after the completion of emulsion polymerization can be removed by a common method such as distillation under reduced pressure.

In the method for producing a chloroprene copolymer latex of the present embodiment, a freezing stabilizer, an emulsion stabilizer, a viscosity modifier, an antioxidant, an antiseptic agent, and the like can be arbitrarily added after polymerization.

<Vulcanizate, Dip Molded Article, Production Method of These>

A vulcanizate of the present embodiment is a vulcanizate of the chloroprene copolymer latex of the present embodiment and is obtained by vulcanizing the chloroprene copolymer latex of the present embodiment. A method for producing a vulcanizate of the present embodiment includes a step of vulcanizing the chloroprene copolymer latex of the present embodiment to obtain a vulcanizate. The vulcanizate of the present embodiment may have a film shape. The thickness (for example, the minimum thickness) of the film-shaped vulcanizate may be 0.01 to 0.5 mm, 0.1 to 0.5 mm, 0.1 to 0.3 mm, or 0.1 to 0.2 mm.

A dip molded article of the present embodiment is a dip molded article of the chloroprene copolymer latex of the present embodiment. The dip molded article of the present embodiment is a dip molded article using the chloroprene copolymer latex of the present embodiment and is obtained by clip molding the chloroprene copolymer latex of the present embodiment. A method for producing a dip molded article of the present embodiment includes a step of dip molding the chloroprene copolymer latex of the present embodiment. Examples of a molding method when the dip molded article of the present embodiment is produced include a congealing liquid dipping method, but the molding method is not limited thereto, and the dip molded article may be molded according to a common method. The dip molded article of the present embodiment may be a dip molded film formed on a base material. The vulcanizate and the dip molded article of the present embodiment are excellent in mechanical properties such as breaking strength and breaking elongation. The dip molded article of the present embodiment may be a molded article of the vulcanizate of the present embodiment. The dip molded article of the present embodiment is preferably gloves, balloons, catheters, or boots.

The vulcanizate and the dip molded article of the present embodiment may contain a vulcanizing agent and/or a vulcanization accelerator, or may not contain a vulcanizing agent and/or a vulcanization accelerator, Whether or not a vulcanizing agent and/or a vulcanization accelerator are blended may be determined depending on a target vulcanizate and a target dip molded article. As the vulcanizing agent and the vulcanization accelerator, for example, the vulcanizing agent and the vulcanization accelerator listed as examples as mentioned above can be used.

EXAMPLES

Hereinafter, the present invention will be more specifically described on the basis of Examples and Comparative Examples; however, the present invention is not limited to these Examples.

<Production of Chloroprene Polymer Latex>

Example 1

To a polymerization tank having an inner volume of 40 L, 95 parts by mass of a chloroprene monomer, 5 parts by mass of 2,3-dichloro-1,3-butadiene monomer, 0.14 parts by mass of diisopropylxanthogen disulfide, 100 parts by mass of pure water, 4.8 parts by mass of tall raw rosin (raw rosin acid that is not disproportionated, manufactured by Harima Chemicals Group, Inc.), 1.50 parts by mass of potassium hydroxide, and 0.40 parts by mass of a sodium salt of β-naphthalene sulfonic acid formalin condensate (trade name "DEMOL, N", manufactured by Kao Corporation) were added. The pH of the aqueous emulsion before polymerization initiation was 12.8. 0.1 parts by mass of potassium persulfate was added as a polymerization initiator, and polymerization was performed under a nitrogen flow at a polymerization temperature of 15° C. Diethylhydroxylamine as a polymerization inhibitor was added at the time point of a polymerization conversion rate of 89% to terminate the polymerization, thereby obtaining a latex. This latex was distilled under reduced pressure to remove the unreacted monomer, and thereby a chloroprene polymer latex having a solid concentration of 60% by mass was obtained.

Examples 2 to 10 and Comparative Examples 1 to 6

A chloroprene polymer latex was obtained in the same manner as in Example 1, except that the conditions were changed to conditions (the polymerization component, the charged amount, the polymerization temperature, the polymerization conversion rate, and the like) shown in the Table 1 and Table 2 below. Example 10, disproportionated potassium rosinate (trade name "RONDIS K-25", manufactured by ARAKAWA CHEMICAL INDUSTRIES, LTD.) was used.

Copolymerization Amount of 2,3-dichloro-1,3-butadiene 3 g of the chloroprene polymer obtained by freeze-drying the aforementioned chloroprene polymer latex was cut into pieces of a cube of 2 mm square to obtain a test piece. The copolymerization amount of the 2,3-dichloro-1,3-butadiene (basis: the total amount of the structural unit derived from chloroprene and the structural unit derived from 2,3-dichloro-1,3-butadiene) in this test piece was measured using a thermal decomposition gas chromatograph (an apparatus in which trade name "IMS-Q1050GC" manufactured by JEOL Ltd. was equipped with trade name "PY-3030D" manufactured by Frontier Laboratories Ltd.). Results are presented in Table 1 and Table 2.

<Measurement of Abietic Acid Peak>

3 g of the chloroprene polymer obtained by freeze-drying the aforementioned chloroprene polymer latex was cut into pieces of a cube of 2 mm square to obtain a test piece. This test piece was put in an eggplant-shaped flask equipped with a condenser and an extract (rosin acids) was extracted with an ethanol/toluene azeotropic mixture (ETA) as defined in JIS K 6229. This extract was measured under the following measurement conditions using a gas chromatograph (trade name "GC-2010Plus", manufactured by SHIMADZU CORPORATION). In this gas chromatography, whether or not the chloroprene polymer has a peak (peak top) derived from abietic acid was checked. Results are presented in Table 1 and Table 2.

[Measurement Conditions of Gas Chromatography]

Used column: FFAP 0.32 mmφ×25 m (film thickness: 0.3 μm)
Column temperature: 200° C.→250° C.
Temperature increase rate: 10° C./min
Injection port temperature: 270° C.
Detector temperature: 270° C.
Injection amount: 2 μL <Measurement of Toluene Insoluble Content>

1 g of the chloroprene polymer obtained by freeze-ding the aforementioned chloroprene polymer latex was cut into pieces of a cube of 2 mm square to obtain a test piece. This test piece was put in a conical beaker and then dissolved in toluene at 23° C. for 16 hours, thereby obtaining a solution. This solution was separated by centrifugation (14000 rpm, 10 minutes) and then the gel fraction was separated using a 200-mesh wire mesh. After this gel fraction was dried to obtain a dried product, the mass of this dried product was measured to thereby obtain the toluene insoluble content. Results are presented in Table 1 and Table 2.

(Production of Evaluation Sample)
(Production of Chloroprene Polymer Latex Composition)

After 5.1 parts by mass of an aqueous dispersion described below was mixed with the aforementioned chloroprene polymer latex (100 parts by mass as the solid content; hereinafter, "part(s) by mass" indicates the amount with respect to 100 parts by mass of the solid content of the chloroprene polymer latex), pure water was added thereto so that the solid concentration of the whole composition was adjusted to 30% by mass, thereby producing a chloroprene polymer latex composition. The above-described aqueous dispersion was prepared by mixing 1 part by mass of sulfur, 2 parts by mass of type II zinc oxide (trade name "Zinc Oxide Type II", manufactured by SAKAI CHEMICAL INDUSTRY CO., LTD.), 2 parts by mass of a butylated reaction product of p-cresol and dicyclopentadiene (trade name "NOCRAC PBK", manufactured by OUCHI SHINKO CHEMICAL INDUSTRIAL CO., LTD.), 0.1 parts by mass of a sodium salt of β-naphthalene sulfonic acid formalin condensate (trade name "DEMOL N", manufactured by Kao Corporation), and 13 parts by mass of pure water at 20° C. for 16 hours using a ceramic ball mill.

(Production of Vulcanized Film)

A ceramic cylinder having an outer diameter of 50 mm was immersed in a congealing liquid (23° C.) obtained by mixing 62 parts by mass of pure water, 35 parts by mass of potassium nitrate tetrahydrate, and 3 parts by mass of calcium carbonate for 1 second and then was taken out. After drying for 4 minutes, the aforementioned cylinder was immersed in the aforementioned chloroprene polymer latex composition at 23° C. for 10 seconds. Then, after washing with running water at 45° C. for 1 minute, vulcanization was performed at 100° C. for 30 minutes, thereby producing a vulcanized film (evaluation sample) on the outer periphery or the like of the cylinder. The vulcanized film seas peeled off from the outer periphery of the cylinder and then the following evaluation was performed.

<Evaluation>

The thicknesses (film thicknesses) of three places at the center portion of the vulcanized film were measured using a test piece thickness meter (trade name "ASKER SDA-12", manufactured by KOBUNSHI KEIKI CO., LTD.) and the minimum thickness was obtained as the thickness of the vulcanized film. Results are presented in Table 1 and Table 2.

The modulus at 100% elongation, the modulus at 500% elongation, the breaking strength, and the breaking elongation of the vulcanized film were measured according to JIS K 6251. Results are presented in Table 1 and Table 2.

TABLE 1

| | | Example | | | | | | | | | |
|---|---|---|---|---|---|---|---|---|---|---|---|
| | | 1 | 2 | 3 | 4 | 5 | 6 | 7 | 8 | 9 | 10 |
| Polymerization component (parts by mass) | Chloroprene | 95 | 85 | 70 | 95 | 85 | 70 | 95 | 70 | 85 | 85 |
| | 2,3-Dichloro-1,3-butadiene | 5 | 15 | 30 | 5 | 15 | 30 | 5 | 30 | 15 | 15 |
| | Diisopropyl xanthogen disulfide | 0.14 | 0.14 | 0.14 | 0.14 | 0.14 | 0.114 | 0.14 | 0.14 | — | 0.14 |
| | Pure water | 100 | 100 | 100 | 100 | 100 | 100 | 100 | 100 | 100 | 100 |
| | Tall raw rosin | 4.8 | 4.8 | 4.8 | 4.8 | 4.8 | 4.8 | 4.8 | 4.8 | 4.8 | — |
| | Disproportionated potassium rosinate | — | — | — | — | — | — | — | — | — | 4.8 |
| | Potassium hydroxide | 1.50 | 1.50 | 1.50 | 1.50 | 1.50 | 1.50 | 1.50 | 1.50 | 1.50 | 1.50 |
| | Sodium salt of β-naphthalene sulfonic acid formalin condensate | 0.40 | 0.40 | 0.40 | 0.40 | 0.40 | 0.40 | 0.40 | 0.40 | 0.40 | 0.40 |
| Polymerization temperature (° C.) | | 15 | 15 | 15 | 23 | 23 | 23 | 15 | 15 | 15 | 15 |
| Polymerization conversion rate (% by mass) | | 89 | 93 | 86 | 90 | 90 | 88 | 67 | 65 | 67 | 88 |
| Copolymerization amount (% by mass) of 2,3-dichloro-1,3-butadiene | | 4.4 | 18.5 | 29.2 | 4.6 | 18.4 | 28.4 | 4.4 | 29.0 | 18.4 | 18.4 |
| Presence or absence of peak derived from abietic acid | | Present | Present | Present | Present | Present | Present | Present | Present | Present | Absent |
| Toluene insoluble content (% by mass) | | 90 | 93 | 91 | 90 | 88 | 91 | 57 | 59 | 86 | 89 |
| Film thickness (mm) | | 0.11 | 0.11 | 0.11 | 0.12 | 0.13 | 0.11 | 0.11 | 0.11 | 0.11 | 0.12 |
| Modulus at 100% elongation (MPa) | | 0.7 | 0.7 | 0.8 | 0.8 | 0.7 | 0.8 | 0.9 | 0.8 | 0.8 | 0.7 |
| Modulus at 500% elongation (MPa) | | 1.2 | 1.3 | 1.3 | 1.5 | 1.2 | 1.3 | 1.5 | 1.3 | 1.2 | 1.2 |
| Breaking strength (MPa) | | 20.8 | 19.3 | 21.6 | 212. | 19.5 | 20.1 | 23.2 | 22.7 | 18.8 | 18.2 |
| Breaking elongation (%) | | 1288 | 1250 | 1188 | 1220 | 1325 | 1324 | 1311 | 1125 | 1100 | 1252 |

TABLE 2

|  |  | Comparative Example | | | | | |
|---|---|---|---|---|---|---|---|
|  |  | 1 | 2 | 3 | 4 | 5 | 6 |
| Polymerization component (parts by mass) | Chloroprene | 100 | 60 | 80 | 85 | 85 | 85 |
|  | 2,3-Dichloro-1,3-butadiene | — | 40 | 20 | 15 | 15 | 15 |
|  | Diisopropyl xanthogen disulfide | 0.14 | 0.14 | 0.14 | 0.56 | — | 0.14 |
|  | Pure water | 100 | 100 | 100 | 100 | 100 | 100 |
|  | Tall raw rosin | 4.8 | 4.8 | 4.8 | 4.8 | 4.8 | 4.8 |
|  | Disproportionated potassium rosinate | — | — | — | — | — | — |
|  | Potassium hydroxide | 1.50 | 1.50 | 1.50 | 1.50 | 1.50 | 1.50 |
|  | Sodium salt of β-naphthalene sulfonic acid formalin condensate | 0.40 | 0.40 | 0.40 | 0.40 | 0.40 | 0.40 |
| Polymerization temperature (° C.) | | 15 | 15 | 15 | 15 | 15 | 15 |
| Polymerization conversion rate (% by mass) | | 89 | 88 | 54 | 90 | 90 | 98 |
| Copolymerization amount (% by mass) of 2,3-dichloro-1,3-butadiene | | 0.0 | 37.8 | 18.8 | 18.4 | 18.4 | 18.4 |
| Presence or absence of peak derived from abietic acid | | Present | Present | Present | Present | Present | Present |
| Toluene insoluble content (% by mass) | | 92 | 90 | 44 | 42 | 96 | 98 |
| Film thickness (mm) | | 0.11 | 0.11 | 0.10 | 0.11 | 0.12 | 0.11 |
| Modulus at 100% elongation (MPa) | | 2.3 | 1.8 | 0.7 | 0.7 | 0.9 | 0.8 |
| Modulus at 500% elongation (MPa) | | 7.1 | 4.8 | 0.8 | 1.2 | 1.5 | 1.5 |
| Breaking strength (MPa) | | 30.8 | 27.0 | 15.0 | 17.2 | 17.5 | 17.2 |
| Breaking elongation (%) | | 940 | 980 | 1381 | 1390 | 1029 | 1002 |

As clearly shown in Table 1 and Table 2, in Examples 1 to 10, mechanical properties such as breaking strength and breaking elongation were excellent. According to comparison between Example 2 and Example 10, it was confirmed that the breaking strength is improved by the chloroprene copolymer providing a peak derived from abietic acid and by using raw rosin acid that is not disproportionated.

In Comparative Example 1, since 2,3-dichloro-1,3-butadiene is not copolymerized and the modulus at 500% elongation is more than 4.0 MPa, the breaking elongation was inferior. In Comparative Example 2, since the modulus at 500% elongation is more than 4.0 MPa, the breaking elongation was inferior. In Comparative Examples 3 and 4, since the toluene insoluble content in the chloroprene copolymer is less than 50% by mass, the breaking strength was inferior. In Comparative Examples 5 and 6, since the toluene insoluble content in the chloroprene copolymer is more than 95% by mass, the breaking strength was inferior.

The invention claimed is:

1. A chloroprene copolymer latex comprising a chloroprene copolymer having a structural unit derived from chloroprene and a structural unit derived from 2,3-dichloro-1,3-butadiene, wherein
    the chloroprene copolymer provides a peak derived from abietic acid in gas chromatography of an extract extracted from the chloroprene copolymer using an ethanol/toluene azeotropic mixture,
    a toluene insoluble content in the chloroprene copolymer is 85 to 95% by mass, and
    a modulus at 500% elongation of a film, which is obtained on a base material by dipping the base material in the chloroprene copolymer latex and then performing vulcanization at 100° C. for 30 minutes, according to JIS K 6251 is 3.5 MPa or less.

2. The chloroprene copolymer latex according to claim 1, wherein a modulus at 100% elongation of the film according to JIS K 6251 is 0.5 to 1.2 MPa.

3. The chloroprene copolymer latex according to claim 1, wherein a content of the structural unit derived from 2,3-dichloro-1,3-butadiene is more than 0% by mass and 35% by mass or less on the basis of a total amount of the structural unit derived from chloroprene and the structural unit derived from 2,3-dichloro-1,3-butadiene.

4. The chloroprene copolymer latex according to claim 1, wherein the chloroprene copolymer latex does not comprise a vulcanization accelerator.

5. A vulcanizate of the chloroprene copolymer latex according to claim 1.

6. A dip molded article of the chloroprene copolymer latex according to claim 1.

7. The dip molded article according to claim 6, wherein the dip molded article is gloves, balloons, catheters, or boots.

8. A method for producing a dip molded article, the method comprising a step of dip molding the chloroprene copolymer latex according to claim 1.

9. A method for producing a chloroprene copolymer latex, the method being a production method for obtaining the chloroprene copolymer latex according to claim 1, the method comprising:
    a polymerization step of subjecting chloroprene and 2,3-dichloro-1,3-butadiene to emulsion polymerization up to a polymerization conversion rate of 60 to 95%, wherein
    in the polymerization step, a content of the 2,3-dichloro-1,3-butadiene is more than 0 parts by mass and 35 parts by mass or less with respect to 100 parts by mass of the total of the chloroprene and the 2,3-dichloro-1,3-butadiene.

10. The method according to claim 9, wherein the polymerization conversion rate is 85 to 95%.

11. The chloroprene copolymer latex according to claim 1, wherein a content of the structural unit derived from 2,3-dichloro-1,3-butadiene is more than 0% by mass and 25% by mass or less on the basis of a total amount of the structural unit derived from chloroprene and the structural unit derived from 2,3-dichloro-1,3-butadiene.

12. The chloroprene copolymer latex according to claim 1, wherein a content of the structural unit derived from 2,3-dichloro-1,3-butadiene is 10 to 35% by mass on the basis of a total amount of the structural unit derived from chloroprene and the structural unit derived from 2,3-dichloro-1,3-butadiene.

13. The chloroprene copolymer latex according to claim 1, wherein the modulus at 500% elongation is 1.5 MPa or less.

14. The chloroprene copolymer latex according to claim 1, wherein a modulus at 100% elongation of the film according to JIS K 6251 is 0.7 to 1.0 MPa.

15. A chloroprene copolymer latex comprising a chloroprene copolymer having a structural unit derived from chloroprene and a structural unit derived from 2,3-dichloro-1,3-butadiene, wherein
- a toluene insoluble content in the chloroprene copolymer is 50 to 95% by mass,
- a modulus at 500% elongation of a film, which is obtained on a base material by dipping the base material in the chloroprene copolymer latex and then performing vulcanization at 100° C. for 30 minutes, according to JIS K 6251 is 3.5 MPa or less, and
- a modulus at 100% elongation of the film according to JIS K 6251 is 0.5 to 1.2 MPa.

16. A chloroprene copolymer latex comprising a chloroprene copolymer having a structural unit derived from chloroprene and a structural unit derived from 2,3-dichloro-1,3-butadiene, wherein
- a toluene insoluble content in the chloroprene copolymer is 85 to 95% by mass, and
- a modulus at 500% elongation of a film, which is obtained on a base material by dipping the base material in the chloroprene copolymer latex and then performing vulcanization at 100° C. for 30 minutes, according to JIS K 6251 is 3.5 MPa or less.

* * * * *